United States Patent
Liang et al.

(10) Patent No.: US 8,289,456 B2
(45) Date of Patent: Oct. 16, 2012

(54) IMAGE CORRECTION METHOD

(75) Inventors: Ren-Kuan Liang, Dajia Township, Taichung County (TW); Meng-Che Tsai, Taipei (TW); Yu-Chieh Hung, Tainan (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 1168 days.

(21) Appl. No.: 12/155,532

(22) Filed: Jun. 5, 2008

(65) Prior Publication Data

US 2008/0309824 A1    Dec. 18, 2008

(30) Foreign Application Priority Data

Jun. 13, 2007   (TW) .............................. 96121438 A

(51) Int. Cl.
- *H04N 5/68* (2006.01)
- *H04N 5/64* (2006.01)
- *H04N 9/31* (2006.01)
- *H04N 5/66* (2006.01)

(52) U.S. Cl. ........ 348/805; 348/806; 348/807; 348/739; 348/744; 348/776

(58) Field of Classification Search ................... 348/739, 348/747, 805–808, 744, 776, 778
See application file for complete search history.

(56) References Cited

U.S. PATENT DOCUMENTS

| | | | |
|---|---|---|---|
| 5,274,307 A * | 12/1993 | Christensen | 315/368.13 |
| 2008/0166043 A1 * | 7/2008 | Bassi et al. | 382/167 |

FOREIGN PATENT DOCUMENTS

JP              63211992 A      9/1988

* cited by examiner

*Primary Examiner* — Pankaj Kumar
*Assistant Examiner* — Alazar Tilahun
(74) *Attorney, Agent, or Firm* — Rabin & Berdo, P.C.

(57) ABSTRACT

Disclosed is an image correction method of correcting an image including a number of horizontal image scan lines each corresponding to a number of pieces of image data. The method includes the following steps: segmenting each of the horizontal image scan lines into a plurality of segments according to a plurality of nodes, each of the segments having an original segment length; looking up a table to generate at least one correction parameter according to a selection signal; generating a gain value according to a control signal; correcting the original segment length to generate an adjusted segment length according to the gain value and the correction parameter; and altering positions of the plurality of nodes to correct the image according to the adjusted segment length.

13 Claims, 12 Drawing Sheets

IMAGE CORRECTION METHOD

This application claims the benefit of Taiwan application Serial No. 096121438, filed Jun. 13, 2007, the subject matter of which is incorporated herein by reference.

BACKGROUND OF THE INVENTION

1. Field of the Invention

The invention relates in general to an image correction method, and more particularly to a digital geometric correction (DGC) method applied to a cathode ray tube (CRT) television system.

2. Description of the Related Art

In the modern age of the changing technology with each passing day, the requirement of the consumer on the multimedia image display quality is getting higher and higher. Various image correction methods for enhancing the multimedia image display quality have been proposed. For example, a deflection control chip in a CRT television system performs a simple outer frame correction, such as an image size, position or key shape correction, on a displayed image in the CRT television system in an analog manner. However, to provide an image correction method which is capable of providing more advanced image correction ability is getting more and more important in the industry.

SUMMARY OF THE INVENTION

The invention is directed to an image correction method, which can effectively improve the drawbacks that a conventional CRT television system can only perform an analog and simple image correction through a deflection control chip and thus cannot effectively provide more advanced image corrections. Thus, it is possible to advantageously obtain substantially more advanced image correction ability.

According to a first aspect of the present invention, an image correction method for a CRT television system is provided. The method includes the following steps: responding to an operation event to obtain a plurality of gain values; determining n offsets, which respectively correspond to n segments between any two adjacent nodes of (n+1) nodes, according to the gain values and a plurality of correction functions corresponding to the gain values, each of the n segments having an original segment length, wherein n is a natural number; correcting the original segment lengths of the n segments to generate n adjusted segment lengths according to the n offsets; determining corrected positions of the (n+1) nodes according to the n adjusted segment lengths and a data enable signal; and determining pixel positions and corresponding image data between the two adjacent nodes of the (n+1) nodes according to ratios of the n adjusted segment lengths to the corresponding n original segment lengths.

According to a second aspect of the present invention, a method of correcting an image is provided. The image comprises a plurality of horizontal image scan lines each corresponding to a plurality of pieces of image data. The method includes the following steps: segmenting each of the horizontal image scan lines into a plurality of segments according to a plurality of nodes, each of the segments having an original segment length; looking up a table to generate at least one correction parameter according to a selection signal; generating a gain value according to a control signal; correcting the original segment length to generate an adjusted segment length according to the gain value and the correction parameter; and altering positions of the plurality of nodes to correct the image according to the adjusted segment length.

The invention will become apparent from the following detailed description of the preferred but non-limiting embodiments. The following description is made with reference to the accompanying drawings.

DETAILED DESCRIPTION OF THE INVENTION

Figure 1:
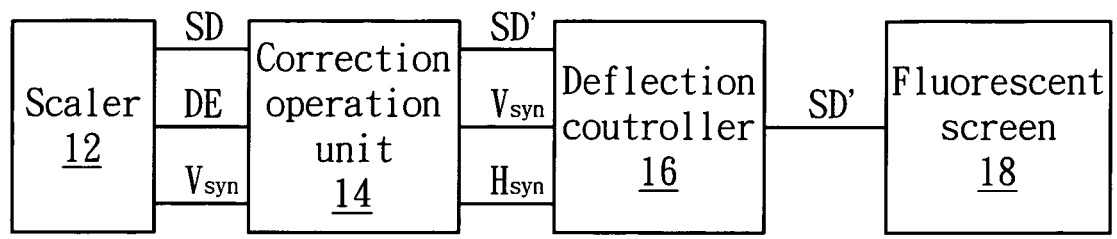
FIG. 1 is a block diagram showing a CRT television system applying an image correction method of the invention.

FIG. 1 is a block diagram showing a CRT television system utilizing an image correction method of the invention. Referring to FIG. 1, a CRT television system 10 includes a scaler 12, a correction operation unit 14, a deflection controller 16 and a fluorescent screen 18. The scaler 12 provides original image data SD, a data enable signal DE and a vertical sync signal Vsyn. The correction operation unit 14 receives the original image data SD and performs a digital geometric correction on SD to provide corrected image data SD' according to the image correction method of this embodiment, and provides horizontal and vertical sync signals Hsyn and Vsyn. Thereafter, the deflection controller 16 projects a corresponding corrected image onto the fluorescent screen 18 according to the corrected image data SD' and the horizontal and vertical sync signals Hsyn and Vsyn. In the following, several actual correcting examples will be given to illustrate the image correction method of this embodiment.

Figure 2:
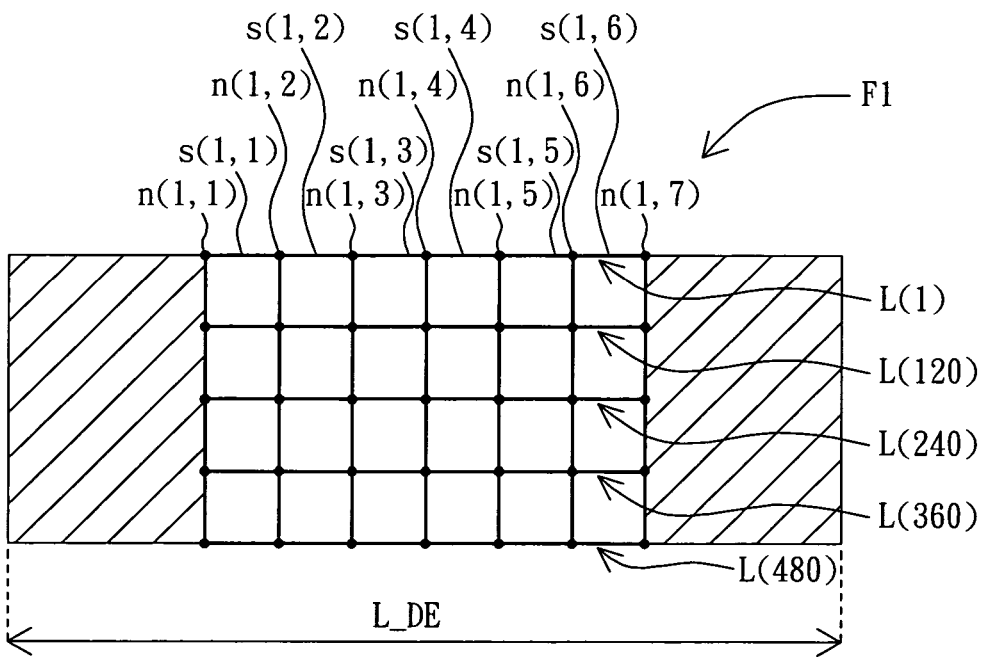
FIG. 2 is a schematic illustration showing an original image F1.
Figure 3:
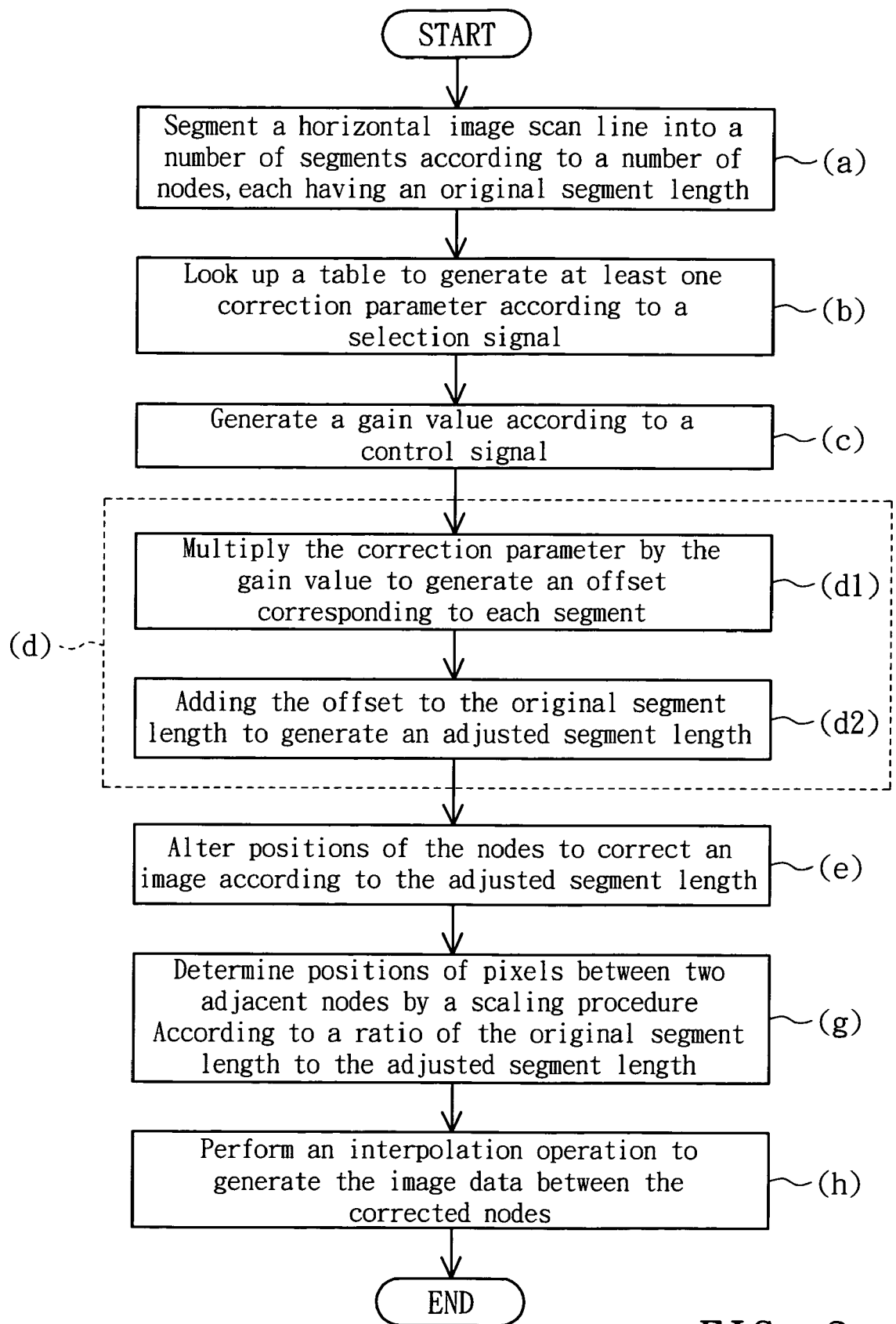
FIG. 3 is a flow chart showing an image correction method according to a first embodiment of the invention.

FIG. 2 is a schematic illustration showing an original image F1. FIG. 3 is a flow chart showing an image correction method according to a first embodiment of the invention. As shown in FIGS. 2 and 3, the original image F1, such as the image data corresponding to 640*480 pixels, is composed of 480 horizontal image scan lines L(1), L(2), L(3), . . . , L(480), each of which corresponds to a number of pieces of original image data SD. In this embodiment, only the $1^{st}$, $120^{th}$, $240^{th}$, $360^{th}$ and $480^{th}$ horizontal image scan lines are depicted.

First Embodiment

In this first embodiment, an outer frame correction is performed on the original image F1 to alter the size, shape or position of the outer frame of the original image F1. Next, the image correction method of this embodiment will be described with reference to the example of performing a W-shape outer frame correction on the original image F1. The method includes the following steps.

First, as shown in step (a), each of the horizontal image scan lines L(1) to L(480) is segmented into n segments by (n+1) nodes, wherein n is a natural number. For example, this embodiment will be described by taking n=6 as an example. Thus, the $1^{st}$ horizontal image scan line L(1) is segmented into six segments, including S(1,1), S(1,2), . . . , S(1,6) segments, by seven nodes, including n(1,1), n(1,2), . . . , n(1,7) nodes, as shown in FIG. 2. Similarly, each of the other horizontal image scan lines is segmented into six segments by seven nodes. For example, the $480^{th}$ horizontal image scan line L(480) is segmented into S(480,1), S(480,2), . . . , S(480,6) segments by n(480,1), n(480,2), . . . , n(480,7) nodes. Each of original segment lengths outer_D_S(1,1) to outer_D_S(480,6) of the segments S(1,1) to S(480,6) is about 1/n lengths of the horizontal image scan line. For example, the original segment length of this embodiment is about a length corresponding to (640/6=106) pixels. The nodes n(1,1), n(1,2), n(1,3), n(1,4), n(1,5), n(1,6) and n(1,7) are respectively located at positions (1,1), (1,107), (1,214), (1,320), (1,427), (1,534) and (1,640). The arrangements of other nodes n(2,1) to n(480,7) and segments S(2,1) to S(480,6) may be derived in a similar manner. However, if the original image data includes 720*480 pixels, the segment length will be (720/6=120) pixels, and the nodes n(1,1), n(1,2), n(1,3), n(1,4), n(1,5), n(1,6) and n(1,7) are respectively located at positions (1,1), (1,121), (1,241), (1,361), (1,481), (1,601) and (1,721). Therefore, each segment will have exactly the same length of 120 pixels. In the following, only the 640*480 image size is taken as an example for illustrating the invention.

Figure 4:
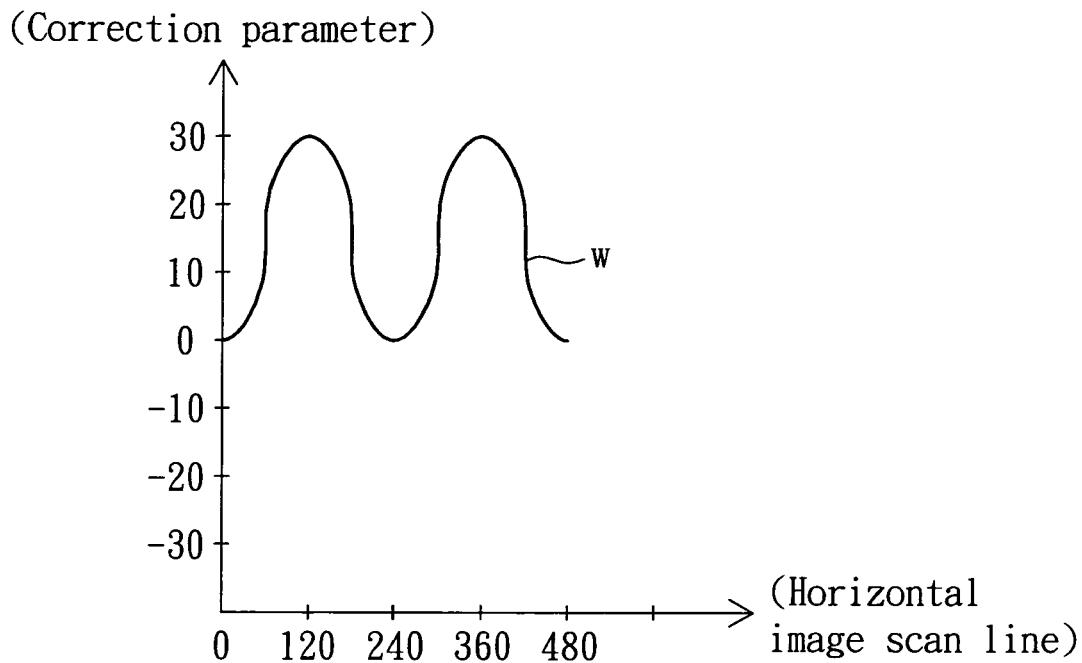
FIG. 4 shows a curve w.

Next, as shown in step (b), at least one correction parameter is generated from a look-up-table according to a selection signal (not shown) provided by the user. In practice, the look-up-table stores a plurality of correction functions, and different correction functions can be obtained according to different selection signals. As shown in FIG. 4, the curve W may be one of the correction functions, and the correction parameter of each horizontal image scan line L(1) to L(480) may be obtained according to this curve. The W-shape outer frame correction will be performed on the original image F1 according to the curve W. In this embodiment, the horizontal axis coordinates 1 to 480 in FIG. 4 correspond to the horizontal image scan lines L(1) to L(480) of the original image F1 so as to perform the mapping through the curve W to obtain the outer frame correction parameters outer_W(1), outer_W(2), . . . , outer_W(480) of the horizontal image scan lines L(1) to L(480). In this embodiment, the curve W is a quartic function.

Then, as shown in step (c), a gain value gn_outer_W corresponding to the current correction function is generated according to the control signal (not shown). Because the correction procedures for each horizontal image scan lines are the same, illustrations will be made by taking the $i^{th}$ horizontal image scan line L(i) as an example, wherein i satisfies the condition: 1≦i≦480. Next, as shown in step (d), the offset of each segment in L(i) is calculated according to the gain value gn_outer_W and the outer frame correction parameter outer_W(i). When the outer frame is being adjusted, the offsets of the segments are the same. That is, $$\text{outer\_offset\_}S(i,1)=\text{outer\_offset\_}S(i,2)=\ldots=\text{outer\_offset\_}S(i,6)=\text{outer\_}W(i)\times gn\_\text{outer}\_W$$

Then, the original segment length is corrected according to the obtained offset value, that is:

$$\text{outer\_}D'\_S(i,k)=\text{outer\_}D\_S(i,k)+\text{outer\_offset\_}S(i,k)\ k=1,2,3,\ldots,6,$$

wherein outer_D_S(i,k) is the original segment length of the $k^{th}$ segment of the $i^{th}$ horizontal image scan line L(i), and outer_D'_S(i,k) is the adjusted segment length of the $k^{th}$ segment of the $i^{th}$ horizontal image scan line L(i).

In this embodiment, the gain value gn_outer_W is a deformation parameter provided by the user; for example, when the gain value gn_outer_W is greater than zero, the size of each offset outer_offset_S(i,k) is directly proportional to the value of the correction parameter outer_W(i); When the gain value gn_outer_W is smaller than zero, the size of the offset outer_offset S(i,k) is inversely proportional to the value of the correction parameter outer_W(i). In this embodiment, illustrations will be made by taking the condition that the gain value gn_outer_W is a real number greater than zero.

Figure 5:
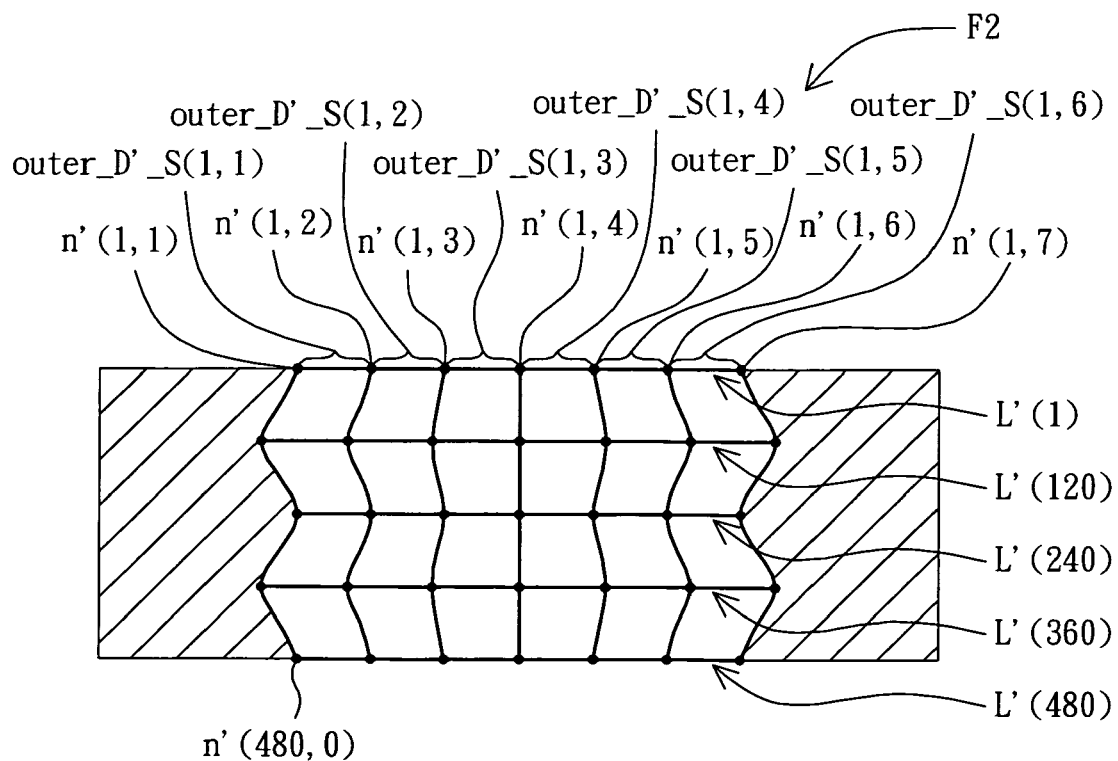
FIG. 5 is a schematic illustration showing a corrected image F2 obtained using the image correction method according to the first embodiment of the invention.

Thereafter, as shown in step (e), the positions of the nodes n(i,1) to n(i,7) are altered, according to the adjusted segment length outer_D'_S(i,k), to generate corrected nodes n'(i,1) to n'(i,7) and therefore to correct the original image F1 to obtain the corrected image F2, as shown in FIG. 5. The enable signal DE in FIG. 1 indicates the width of the outputted enable signal. More specifically, the width L_DE of the total displayable region including the original image F1 and the unused display areas (i.e., hatched areas), which are disposed at two sides of the original image F1 can be determined according to the enable signal DE. That is, $$L\_DE=La+Lb+\text{outer}\_D\_S(i,1)+\text{outer}\_D\_S(i,2)+\ldots+\text{outer}\_D\_S(i,6),$$

wherein La and Lb respectively represent the widths of the unused display area at the left side and the right side of the original image F1. When the positions of the corrected nodes n'(i,1) to n'(i,7) are being determined, the middle position of the displayable range of the screen can be determined first according to one half of the width value L_DE of the displayable range, and then the positions of the corrected node n'(i,1) and the corrected nodes n'(i,2) to n'(i,7) can be determined accordingly. The equations to determine the positions of the corrected nodes n'(i,1) to n'(i,7) are listed in the following.

$$n'(i, 1) = \frac{L\_DE}{2} - \sum_{k=1}^{n/2} \text{outer}\_D'\_S(i, k)$$

$$n'(i, k+1) = n'(i, 1) + \sum_{j=1}^{k} \text{outer}\_D'\_S(i, j) \quad 1 \le k \le 6$$

After step (e), the method may further include step (g) of determining the positions, outer_P(i,k,x), of the pixels between two adjacent nodes on the same horizontal image scan line by a scaling procedure according to a ratio of the original segment length outer_D_S(i,k) to the corresponding adjusted segment length outer_D'_S(i,k).

$$\text{outer}\_P(i, k, x) = n'(i, k) + \frac{\text{outer}\_D'\_S(i, k)}{\text{outer}\_D'\_S(i, k)} \times x,$$

where outer_P(i,k,x) represents the position of the $x^{th}$ pixel of the $k^{th}$ segment of the $i^{th}$ horizontal image scan line.

After step (g), the method further includes step (h) of generating the image data between any two adjacent corrected nodes n'(i,1) to n'(i,7) on the same horizontal image scan lines by interpolation. The interpolation method may be a linear interpolation or a polynomial interpolation method.

In this embodiment, illustrations are made by taking the image data of 640*480 pixels as the original image F1; however, the size of the original image F1 is not restricted to 640*480 pixels. In this embodiment, the look-up-table records the curve W, which maps the horizontal image scan lines L(1) to L(480) to the corresponding correction parameters outer_W(1) to outer_W(480) of the original image F1, however, the range of the coordinate value of the horizontal axis of the curve W is not restricted to what are equal to the range of the value of the horizontal image scan line of the original image F1. Instead, it is possible to find out the correction parameters outer_W(1) to outer_W(480) of the corresponding horizontal image scan lines through the simple mathematical operation, such as the interpolation operation.

Figure 6:
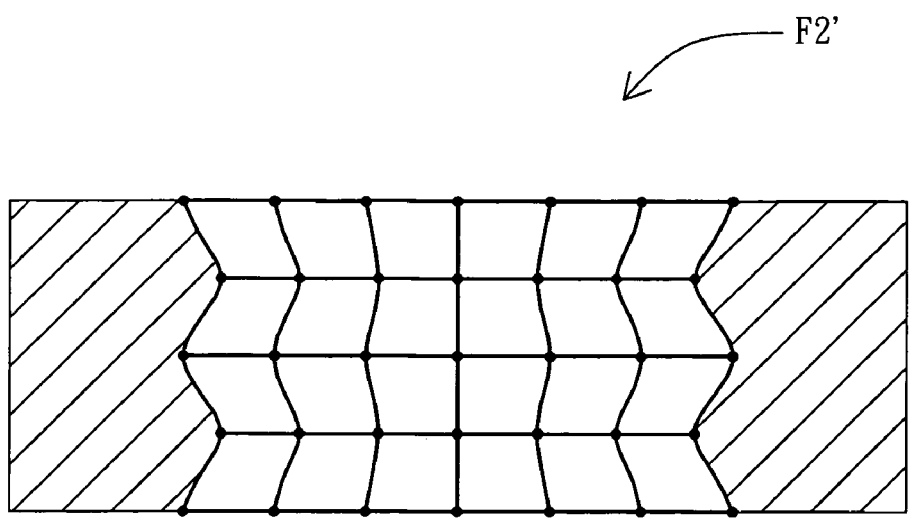
FIG. 6 is a schematic illustration showing a corrected image F2'.

In this embodiment, illustrations are made as an example by taking the operation, which is performed when the gain value gn_outer_W is a real number greater than zero; however, the gain value gn_outer_W may also be a real number smaller than zero. When the gain value gn_outer_W of this embodiment is smaller than zero, the schematic illustration of the corrected image F2' is shown in FIG. 6.

In this embodiment, illustrations are made as an example by taking the operation, which is performed when each of the horizontal image scan lines L(1) to L(480) is segmented into 6 segments by 7 nodes; however, the image correction method of this embodiment is not restricted to the condition that each of the horizontal image scan lines L(1) to L(480) is segmented into 6 segments. Instead, each horizontal image scan line may be segmented into (A+1) segments by A nodes, wherein A is an odd number.

Figure 7A:
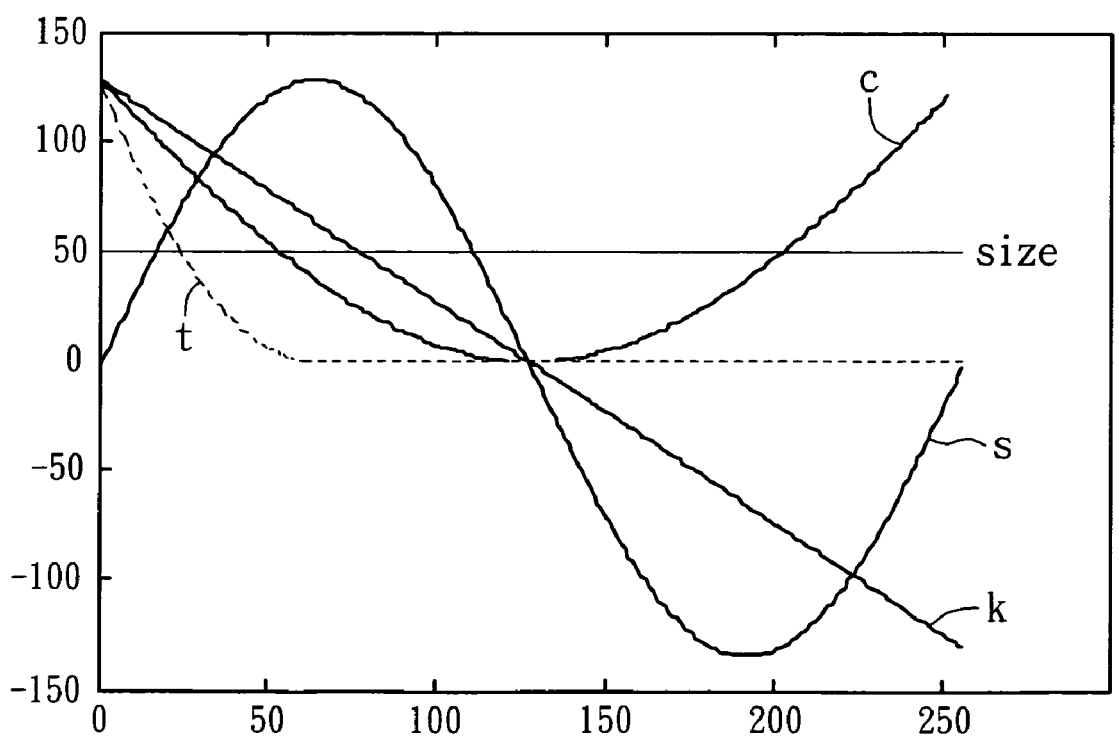
FIGS. 7A and 7B show curves k, c, s, t and b.
Figure 7B:
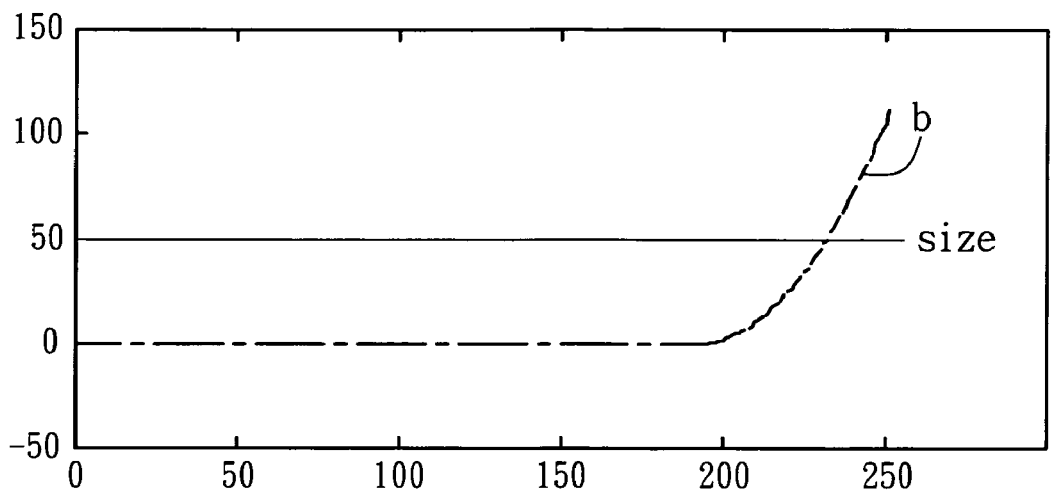
Figure 8:
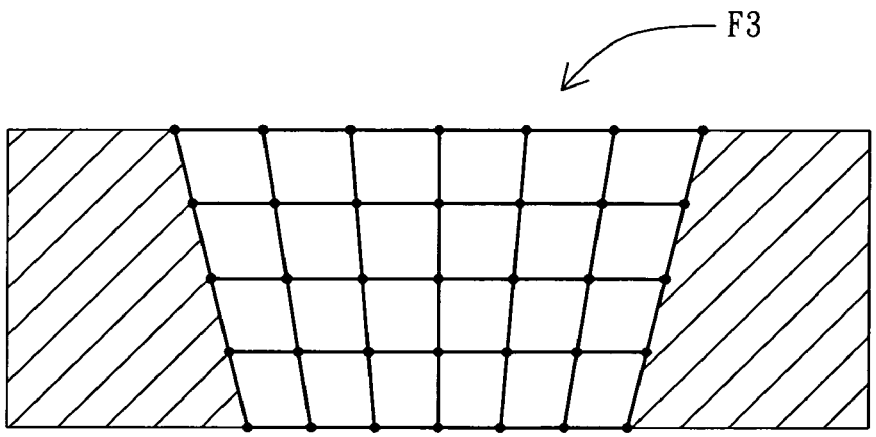
FIG. 8 is a schematic illustration showing a corrected image F3.
Figure 9:
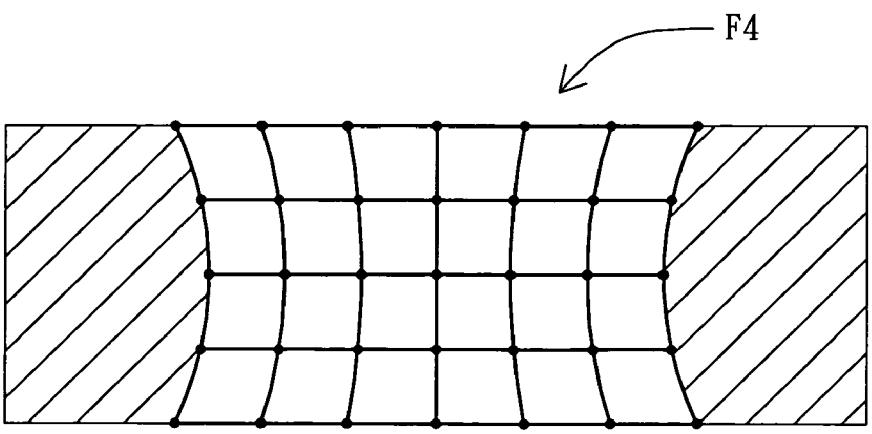
FIG. 9 is a schematic illustration showing a corrected image F4.
Figure 10:
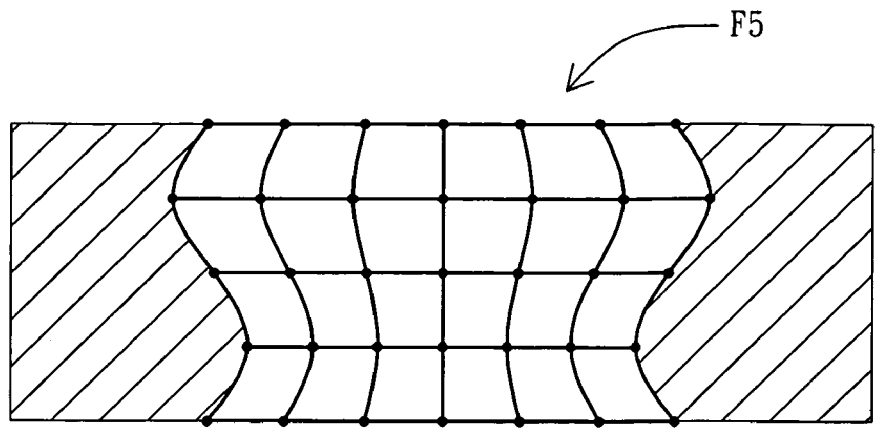
FIG. 10 is a schematic illustration showing a corrected image F5.
Figure 11:
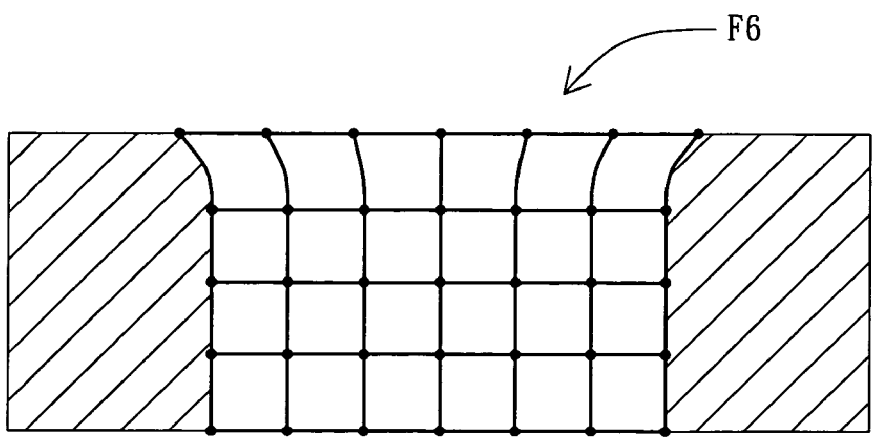
FIG. 11 is a schematic illustration showing a corrected image F6.
Figure 12:
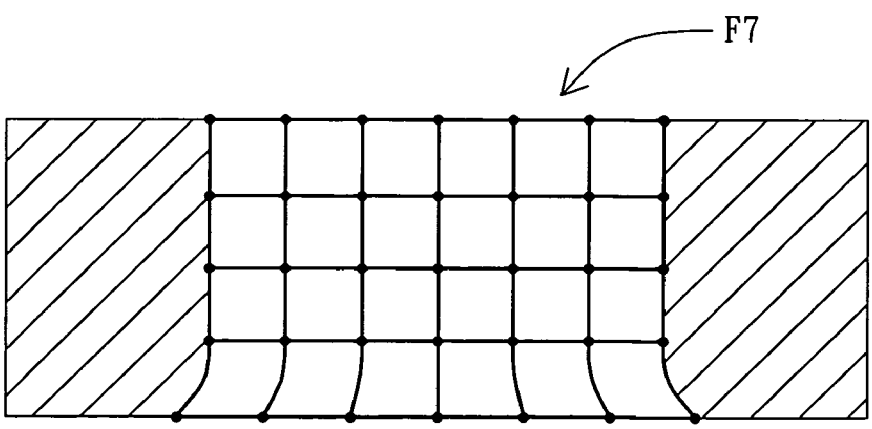
FIG. 12 is a schematic illustration showing a corrected image F7.

In this embodiment, illustrations are made as an example by performing the W-shape outer frame correction on the original image F1 according to the corresponding curve W in the look-up-table. However, the image correction method of this embodiment is not restricted to the W-shape outer frame correction performed on the original image F1. Instead, any other type of outer frame correction may be performed. For example, the image correction method of this embodiment may further respond to different selection signals to obtain other types of curves from the look-up-table. FIGS. 7A and 7B show curves k, c, s, t and b respectively corresponding to the Key-shape, C-shape, S-shape, T-shape and B-shape outer frame corrections. The corrected images F3 to F7 respectively generated according to the corresponding correction functions of the outer frame corrections are shown in FIGS. 8 to 12.

Figure 13:
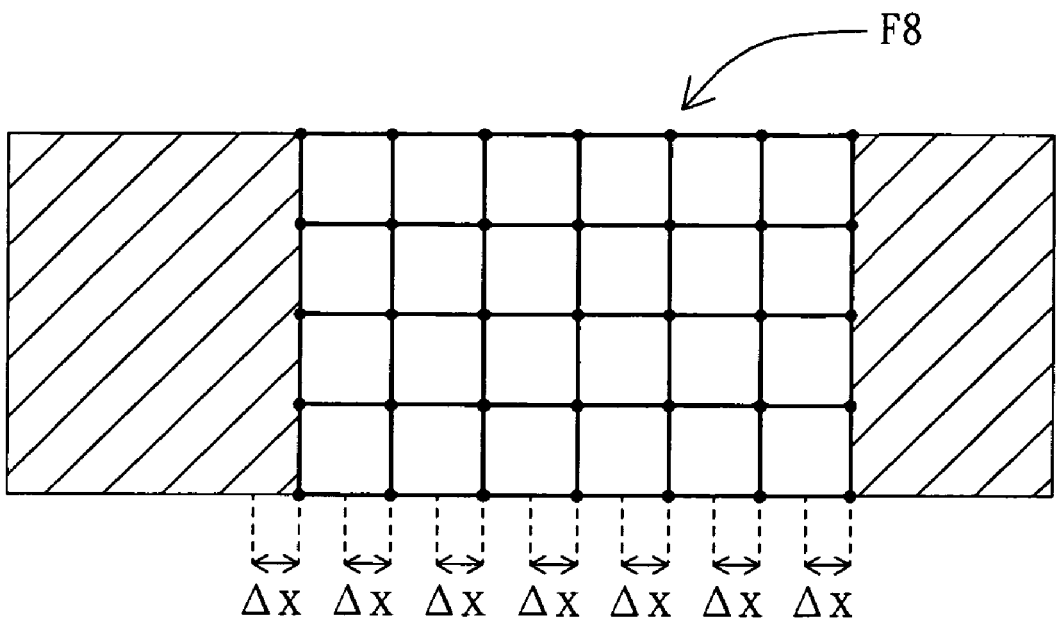
FIG. 13 is a schematic illustration showing a corrected image F8.

The correction method of this embodiment can not only perform the above-mentioned various outer frame corrections on the original image F1 but also perform the size adjustment and the horizontal position adjustment on the original image F1, as shown in FIG. 13. When the size adjustment is to be performed on the original image F1, the size curve shown in FIG. 7A is substantially equal to a straight line for mapping the segments of each of the horizontal image scan lines L(1) to L(480) of the original image F1 to the same offset to adjust the size of the original image F1. In this embodiment, the offset is greater than zero so that the original image F1 is scaled up to obtain a corrected image F8.

When the horizontal position adjustment is to be performed on the corrected image F8, the $k^{th}$ new node n''(i,k) of the $i^{th}$ horizontal image scan line is obtained according to equation $$n''(i,k)=n'(i,k)+\Delta x.$$

Please note that if no outer frame adjustment is performed on the original image before the horizontal position adjustment is performed on the original image, the corrected nodes n'(i,k) are respectively equal to the nodes n(i,k).

In this embodiment, illustrations are made as an example by taking the correction, which is performed on the original image F1 according to the corresponding curve by responding to the selection signal; however, the correction method of this embodiment may further respond to two or more selection signals to find out the corresponding correction parameters according to the corresponding curves, respectively. For example, the correction parameters size(1) to size(480), outer_K(1) to outer_K (480), outer_C(1) to outer_C(480), outer_S(1) to outer_S(480), outer_W(1) to outer_W(480), outer_T(1) to outer_T(480) and outer_B(1) to outer_B(480) may be found according to the curves size, k, c, s, w, t and b. Then, the offset outer_offset_S(i,k) of each segment of the $i^{th}$ horizontal image scan line is calculated according to the following equation:

$$\text{outer\_offset\_}S(i, k) = $$
$$\text{gn\_size} \times \text{size}(i) + \text{gn\_outer\_}K \times \text{outer\_}K(i) + \text{gn\_outer\_}C \times \text{outer\_}C(i) + $$
$$\text{gn\_outer\_}S \times \text{outer\_}S(i) + \text{gn\_outer\_}W \times \text{outer\_}W(i) + $$
$$\text{gn\_outer\_}T \times \text{outer\_}T(i) + \text{gn\_outer\_}B \times \text{outer\_}B(i)$$

Equivalent outer frame correction offsets are found by superimposing correction parameter in order to perform the outer frame corrections on the original image F1, which include the size, K, C, S, W, T and B shape corrections, wherein gn_size, gn_outer K, gn_outer_C, gn_outer_S, gn_outer_W, gn_outer_T and gn_outer_B respectively correspond to the gain values of the above-mentioned correction parameters.

The image correction method of this embodiment performs digital geometric correction on the image by setting a number of nodes on the horizontal image scan lines of the digital image data, adjusting the position of each node and finding out all image data between two adjacent adjusted nodes. Thus, the image correction method of this embodiment can effectively improve the drawbacks that the conventional CRT television system can only perform analog and simple image corrections through the deflection chip and thus cannot effectively provide the more advanced image corrections. Thus, the invention substantially has the advantages of providing abilities of digital and more advanced image corrections.

Second Embodiment

Figure 14:
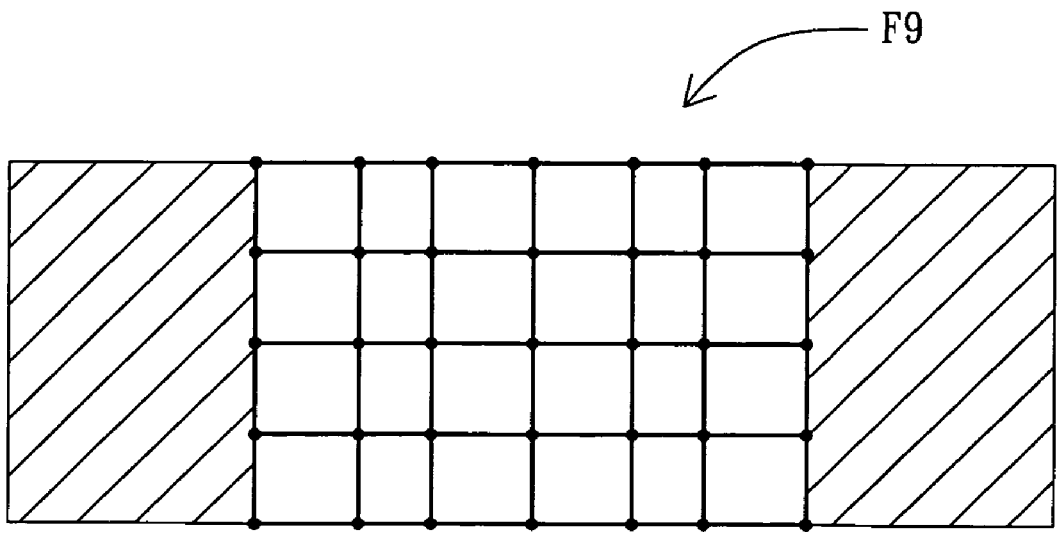
FIG. 14 is a schematic illustration showing a corrected image F9, which is obtained using an image correction method according to a second embodiment of the invention.
Figure 15:
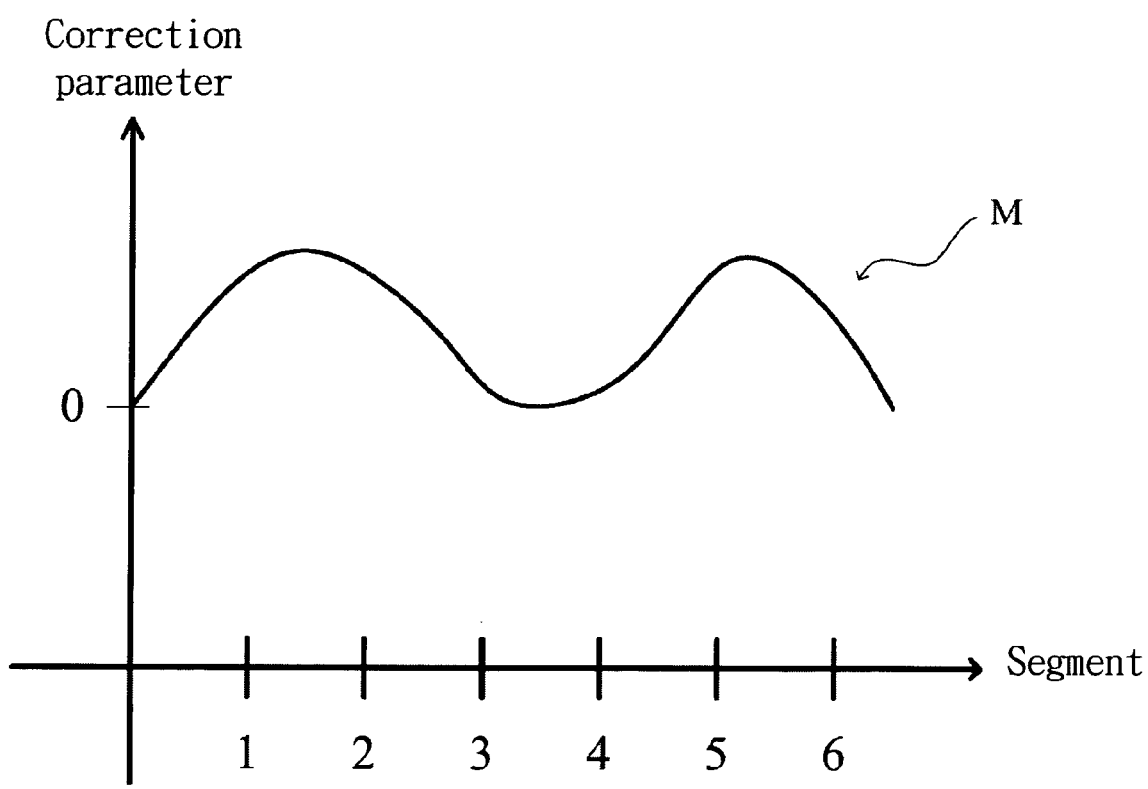
FIG. 15 shows a curve M corresponding to a correction parameter M.

The second embodiment is to perform a first kind of inner frame correction on the original image F1 to alter the inner frame shape of the original image F1. FIG. 14 is a schematic illustration showing a corrected image F9, which is obtained using an image correction method according to a second embodiment of the invention. The difference between the image correction methods of the second embodiment and the first embodiment will be described in the following. In the first embodiment, each horizontal image scan line L(i) respectively has its own correction parameter outer_W(i), and each segment of the same horizontal image scan line can be adjusted according to the correction parameter corresponding to the horizontal image scan line. In the second embodiment, however, the segments at the same position of each horizontal image scan line L(i) correspond to the same correction parameter, so each segment of a specific horizontal image scan line L(i) corresponds to respective correction parameters. Thus, the correction parameters corresponding to different segments are looked up according to different correction functions in the step (b) of the image correction method of this embodiment. For example, as shown in FIG. 15, the correction function M of FIG. 15 maps different segments of the original image F1 to different correction parameters inner M(1) to inner_M(6).

Consequently, the image correction method of this embodiment may also obtain the data, such as the offset inner1_offset_S(i,k), the adjusted segment length inner1_D'_S(i,k), the corrected node n'(i,k) and the pixel position inner_P(i,k,x) between the corrected nodes according to the equations similar to those of the first embodiment. The data will be respectively calculated according to the following equations:

$$\text{inner1\_offest\_S}(i, k) = \text{inner\_M}(k) \times \text{gn\_inner\_M}$$

$$k = 1, 2, 3, \ldots, 6,$$

$$\text{inner1\_D'\_S}(i, k) = \text{inner1\_D\_S}(i, k) + \text{inner1\_offset\_S}(i, k)$$

$$k = 1, 2, 3, \ldots, 6,$$

$$n'(i, k+1) = n(i, 1) + \sum_{j=1}^{k} \text{inner1\_D'\_S}(i, j) \ 1 \le k \le 6, \text{ and}$$

$$\text{inner1\_P}(i, k, x) = n'(i, k) + \frac{\text{inner1\_D\_S}(i, k)}{\text{inner1\_D'\_S}(i, k)} \times x,$$

wherein n(i,1)=n'(i,1). Thus, all the image data between the corrected nodes may be generated by way of scaling and interpolation to obtain the corrected image F9, wherein gn_inner_M is the corresponding gain value. Therefore, the M-shape inner correction may be performed on the original image F1.

Please note that the sum of segment offsets on the same horizontal image scan line should be equal to zero in this embodiment, that is, $$\sum_{k=1}^{6} \text{inner1\_offset\_S}(i, k) = 0.$$

This represents that the result of the outer frame correction will not be influenced when the inner frame correction is performed. That is, after the shape of the outer frame is fixed, performing the inner frame correction cannot alter the shape of the outer frame.

Figure 16:
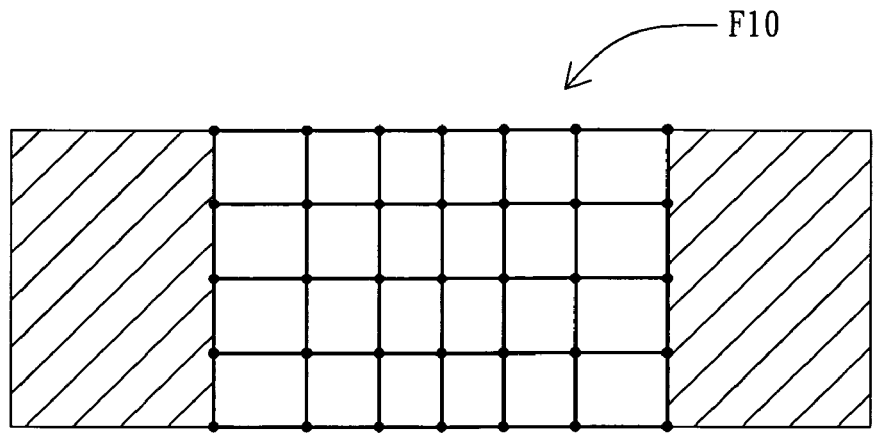
FIG. 16 is a schematic illustration showing a corrected image F10.
Figure 17:
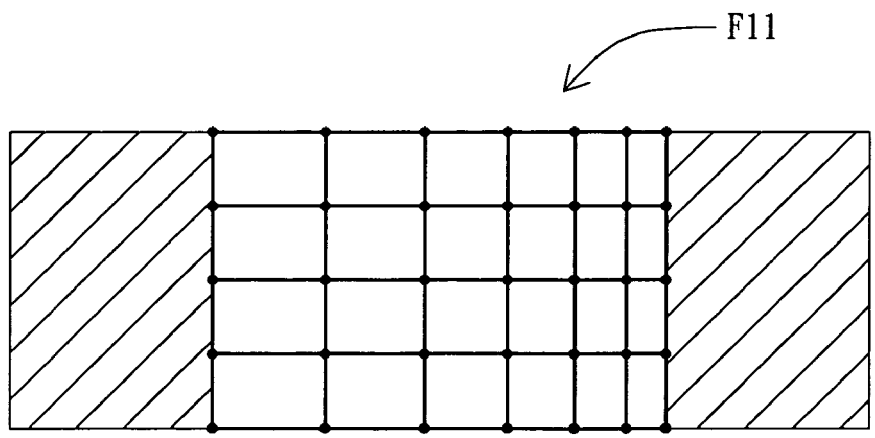
FIG. 17 is a schematic illustration showing a corrected image F11.

In this embodiment, illustrations are made as an example by taking the operation of performing the M-shape inner frame correction on the original image F1; however, the image correction method of this embodiment is not particularly restricted to the M-shape inner frame correction performed on the original image F1. Instead, the corrected images F10 and F11 respectively corresponding to the S-shape inner frame correction and the L-shape inner frame correction are shown in FIGS. 16 and 17.

In this embodiment, illustrations are made as an example by taking the operation of performing the M-shape inner correction on the original image F1; however, the image correction method of this embodiment may further perform any two or all of the M-shape, S-shape and L-shape inner corrections on the original image F1 simultaneously. For example, the following equation is directed to the offset obtained by performing the M-shape, S-shape, L-shape inner corrections on the original image F1 simultaneously:

$$\text{inner1\_offset\_S}(i, k) = \text{gn\_inner\_M} \times \text{inner\_M}(k) + \\ \text{gn\_inner\_S} \times \text{inner\_S}(k) + \text{gn\_inner\_L} \times \text{inner\_L}(k).$$

Similarly, it has to satisfy:

$$\sum_{k=1}^{6} \text{inner1\_offset\_S}(i, k) = 0,$$

wherein inner_S(k) is the correction parameter corresponding to the $k^{th}$ segment of the S-shape inner correction, inner_L(k) is the correction parameter corresponding to the $k^{th}$ segment of the L-shape inner correction, and gn_inner_S and gn_inner_L are respective gain values corresponding to the above-mentioned correction parameters.

Third Embodiment

Figure 18:
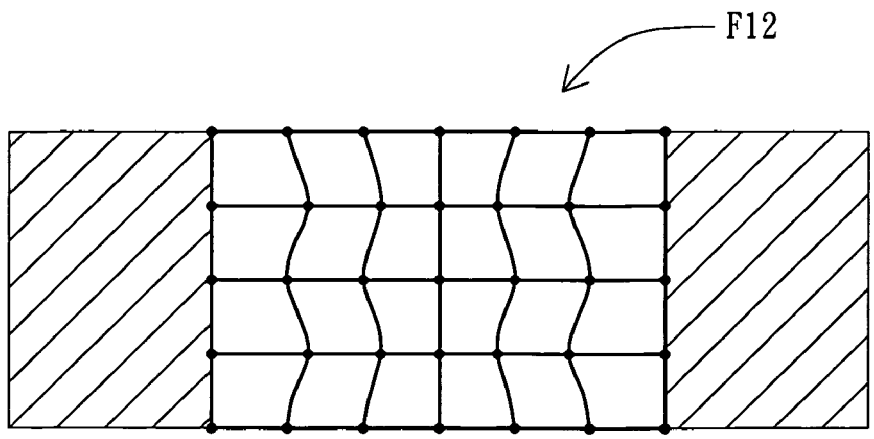
FIG. 18 is a schematic illustration showing a corrected image F12, which is obtained using an image correction method according to a third embodiment of the invention.
Figure 19:
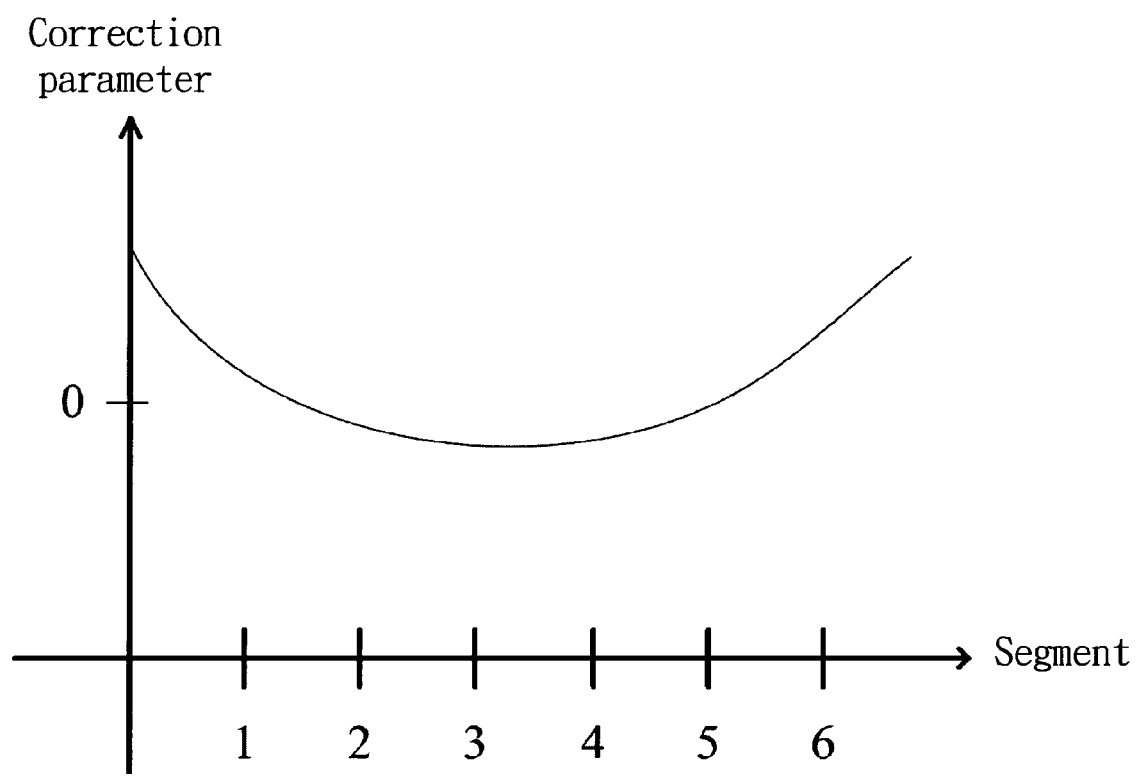
FIG. 19 shows a curve c.
Figure 20:
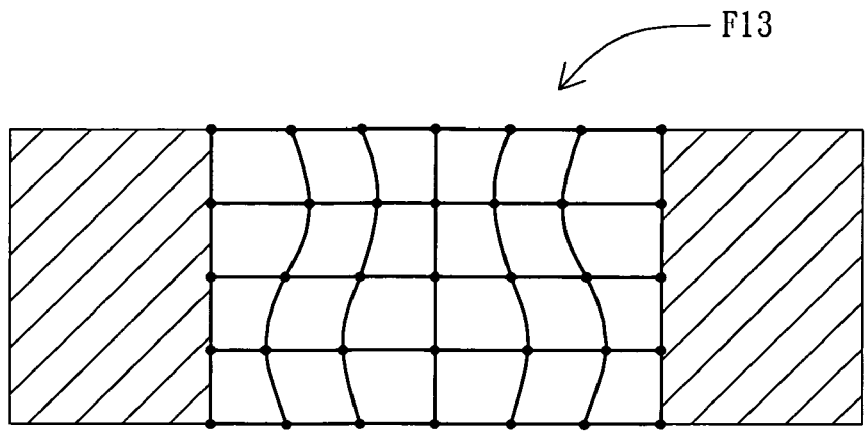
FIG. 20 is a schematic illustration showing a corrected image F13.
Figure 21:
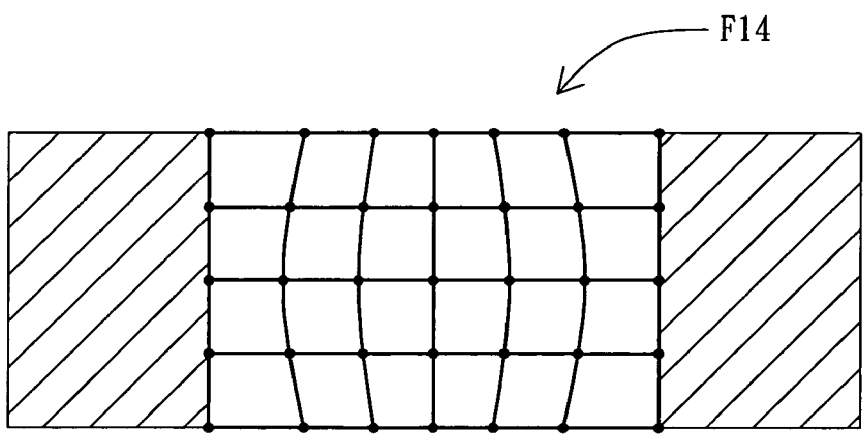
FIG. 21 is a schematic illustration showing a corrected image F14.
Figure 22:
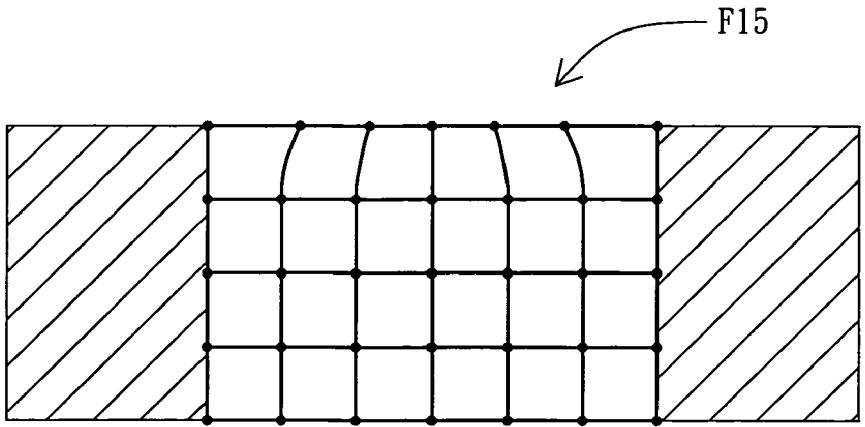
FIG. 22 is a schematic illustration showing a corrected image F15.
Figure 23:
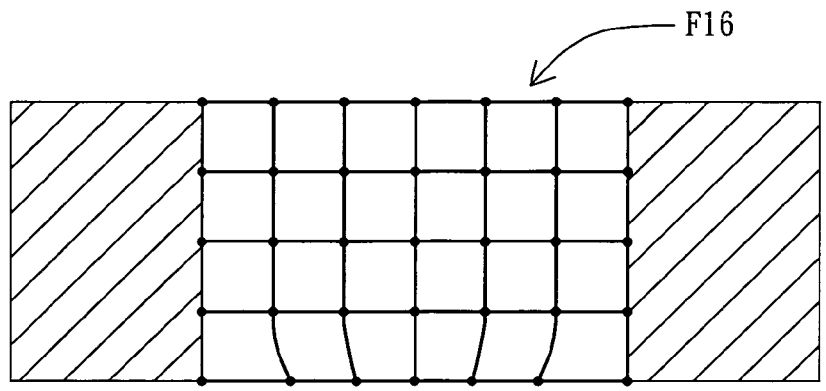
FIG. 23 is a schematic illustration showing a corrected image F16.

The third embodiment is to perform a second kind of inner correction on the original image F1 to alter the inner shape of the original image F1. FIG. 18 is a schematic illustration showing a corrected image F12, which is obtained using an image correction method according to a third embodiment of the invention. As shown in FIG. 18, the variation of the original image F1 in the horizontal direction follows a correction function, and the variation of the original image F1 in the vertical direction follows another correction function in this embodiment. In detail, in the horizontal direction, each segment on the same horizontal image scan line has its own correction parameter according to a first correction function, as shown in the second embodiment; and in the vertical direction, each horizontal image scan line has respective correction parameter according to a second correction function, as shown in the first embodiment. For example, each horizontal image scan line can find the respective correction parameter inner_W(i) according to the W curve of FIG. 4. On the other hand, each segment of the same horizontal image scan line can find the correction parameter Horizontal_C(k) according to the c curve of FIG. 19. The segment width of each segment of each horizontal image scan line L(i) may be adjusted to find the newly corrected nodes according to the two correction parameters. In the practical operation, the look-up-tables of this embodiment include two directions of look-up-tables.

That is, the look-up-table corresponding to 480 scan lines of the frame in the vertical direction has the size of 480×1, and the look-up-table corresponding to 6 segments of the frame in the horizontal direction has the size of 1×6.

Thus, the offset of the $k^{th}$ segment of the $i^{th}$ horizontal image scan line may be represented as:

inner2_offset_$S(i,k)$=inner_$W(i)$×gn_inner_$W$× Horizontal_$C(k)$×gn_Horizontal_$C$ wherein gn_inner_W and gn_Horizontal_C are respective the gain values corresponding to the correction parameters inner_W(i) and Horizontal_C(k). Thereafter, the corrected nodes may be found according to the method similar to that of each of the first and second embodiments, and the image data between all corrected nodes may be generated to obtain the corrected image F12 by way of scaling and interpolation.

Similarly, the sum of the offsets of the segments on the same horizontal image scan line should be equal to zero in this embodiment, that is, $$\sum_{k=1}^{6} \text{inner2\_offset\_S}(i, k) = 0.$$

Thus, the result of the outer frame correction will not be influenced when the second kind of inner frame correction is performed. That is, after the shape of the outer frame is fixed, performing the second kind of inner frame correction will not alter the shape of the outer frame.

In addition to the image correction performed according to the vertical w curve in conjunction with the horizontal c curve in FIG. 18, the correction curve in the vertical direction further includes the s, c, t or b curve, and the respective inner correction is performed in conjunction with the c curve in the horizontal direction to generate the corrected images F13 to F16, as shown in FIGS. 20 to 23.

In this embodiment, illustrations are made as an example by taking the inner frame correction, which is performed on the original image F1 in the vertical direction according to the respective w, s, c, t or b curve; however, the image correction method of this embodiment may further perform the inner frame correction in the vertical direction simultaneously according to many curves in conjunction with the c curve on the horizontal direction. For example, if the inner frame correction is performed according to the s, c and t curves in the vertical direction, the offset of the $k^{th}$ segment of the $i^{th}$ horizontal image scan line may be represented as:

inner2_offset_$S(i, k)$ = (inner_$S(i)$ × gn_inner_S + inner_$C(i)$ × gn_inner_C + inner_$T(i)$ × gn_inner_T) × Horizontal_$C(k)$ × gn_Horizontal_C wherein inner_S(i), inner_C(i) and inner_T(i) respectively correspond to the correction parameters of the correction functions s, c and t; and gn_inner_S, gn_inner_C and gn_inner_T respectively correspond to the gain values of the correction parameters inner_S(i), inner_C(i) and inner_T(i). Similarly, the following condition must be satisfied:

$$\sum_{k=1}^{6} \text{inner2\_offset\_S}(i, k) = 0$$

Fourth Embodiment

Figure 24:
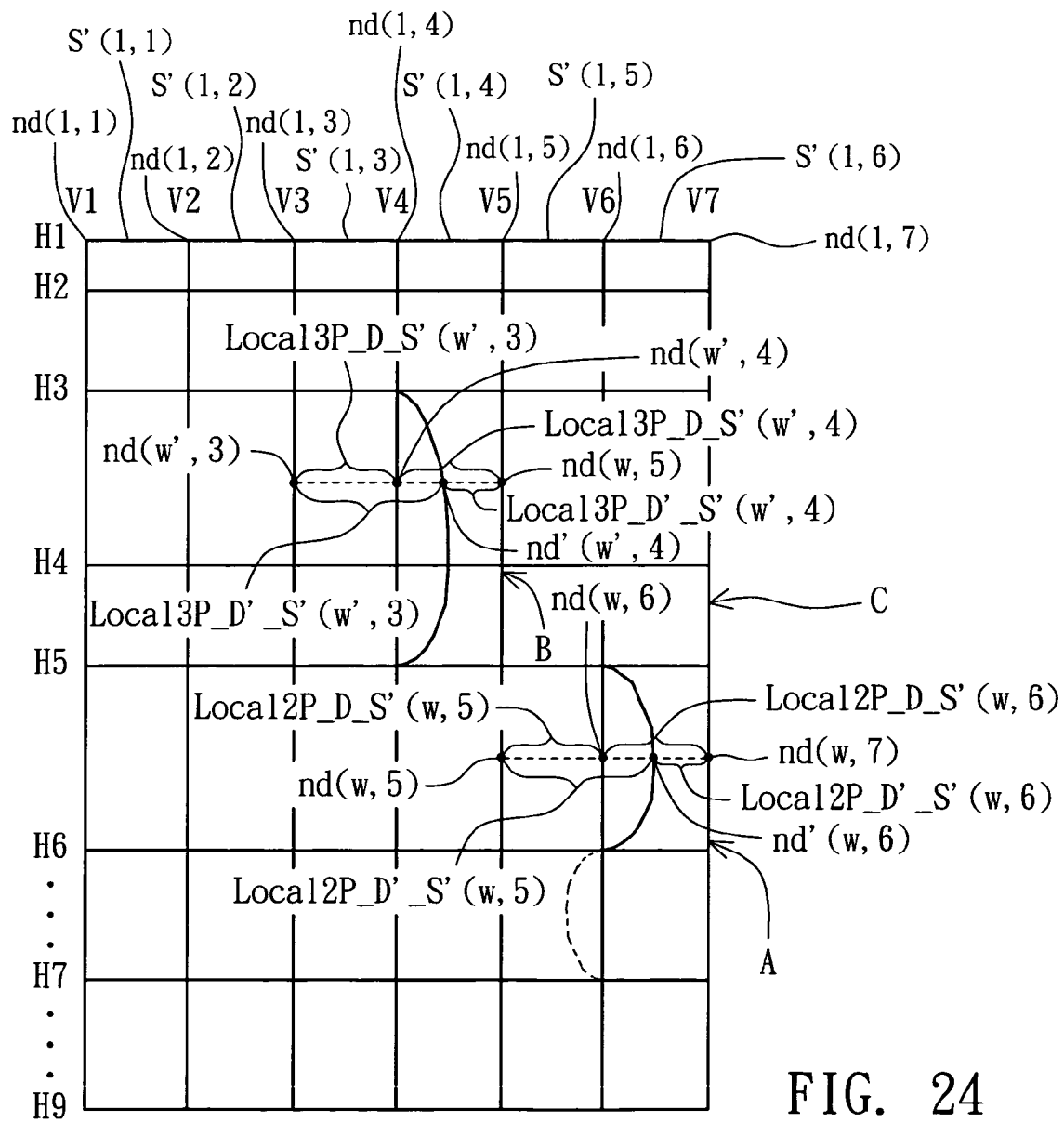
FIG. 24 is a schematic illustration showing an image correction method according to a fourth embodiment of the invention.

The fourth embodiment is to perform a local correction on the original image F1. FIG. 24 is a schematic illustration showing an image correction method according to a fourth embodiment of the invention. The difference between the image correction methods of the fourth and first embodiments will be described in the following. The image correction method of the fourth embodiment is to add y horizontal local adjustment lines and z vertical local adjustment lines to the original image F1, to segment the original image F1 into multiple image zones by the horizontal and vertical local adjustment lines and to perform the local corrections on the image zones. The z vertical local adjustment lines intersect with each of the horizontal image scan lines L(1) to L(480) to form z nodes. For example, if z=7, then vertical local adjustment lines V1 to V7 intersect with the first horizontal image scan line L(1) to form seven reference nodes nd(1,1), nd(1,2), . . . , nd(1,7), and the first horizontal image scan line L(1) is segmented by the reference nodes nd(1,1) to nd(1,7) into six reference segments S'(1,1), S'(1,2), . . . , S'(1,6), as shown in FIG. 24. The configurations of the other reference nodes nd(2,1) to nd(480,7) and the reference segments S'(2,1) to S'(480,7) may be obtained in a manner similar to that mentioned hereinabove. When y is equal to 9, the vertical positions of the horizontal local adjustment lines H1 to H9 may be adjusted. In this embodiment, the horizontal local adjustment lines H1 to H9 respectively overlap with the horizontal image scan lines L(1), L(10), L(20), L(120), L(160), L(260), L(320), L(420) and L(480), for example.

The image correction method of this embodiment includes, for example, a two-point local correction method and a three-point local correction method, which will be respectively described in the following.

Two-Point Local Correction Method

This method is to map the correction function to two adjacent reference nodes on one vertical local adjustment line so as to correct the zone pertaining thereto. For example, the method of performing the two-point local correction on the zone A enclosed by the horizontal local adjustment lines H5 and H6 and the vertical local adjustment lines V5 and V7 includes the following steps. First, the correction function is selected from a plurality of correction functions stored in the look-up-table according to the selection signal provided by the user. For example, the selected correction function corresponds to the curve c of C-shape correction. Next, the horizontal axis coordinates 1 to 250 of FIG. 7A correspond to the reference segments S'(160,5) to S'(260,5) in the zone A so as to perform the mapping through the curve c to obtain the local correction parameters local2P_C(160), local2P_C(161), . . . , local2P_C(260) corresponding to the reference segments S'(160,5) to S'(260,5) and to calculate the corresponding offsets local2P_offset_S'(160,5) to local2P_offset_S'(260,5) according to the local correction parameters local2P_C(160) to local2P_C(260) and the gain value gn_local2P_C. Because the correction methods of each reference segment S'(160,5) to S'(260,5) are the same, illustrations will be made by taking the reference segments S'(w,5) and S'(w,6) on the $w^{th}$ horizontal image scan line as an example, wherein 160≦w≦260.

Next, the image correction method of this embodiment can obtain the data, such as the adjusted segment length local2P_D'_S'(w,5), the position of the corrected reference node nd'(w,6) and the positions local2P_P(w,5,x) of the pixels between the corrected reference node nd'(w,6) and the reference node nd(w,5), according to the equations similar to those of the first embodiment. The respective calculation method is listed in the following.

$$local2P\_offset\_S'(w, 5) = local2P\_C(w) \times gn\_local2P\_C,$$

$$local2P\_D'\_S'(w, 5) = local2P\_D\_S'(w, 5) + local2P\_offset\_S'(w, 5),$$

$$nd'(w, 6) = nd(w, 5) + local2P\_D'\_S'(w, 5), \text{ and}$$

$$local2P\_P(w, 5, x) = nd(w, 5) + \frac{local2P\_D\_S'(w, 5)}{local2P\_D'\_S'(w, 5)} \times x.$$

In addition, the image data between the reference node nd(w,5) and the corrected reference node nd'(w,6) are generated by way of scaling and interpolation, wherein gn_local2P_C is the corresponding gain value.

Please note that the sum of the offsets local2P_offset_S'(w,5) and local2P_offset_S'(w,6) on two reference segments of the same horizontal image scan line in the zone A should be equal to zero. That is, $$local2P\_offset\_S'(w,5) + local2P\_offset\_S'(w,6) = 0.$$

This represents that the image display result in the zone other than the zone A will not be influenced when the local correction of the zone A is being performed. Consequently, it is also possible to obtain the data, such as the offset local2P_offset_S'(w,6), the adjusted segment length local2P_D'_S'(w,6) and the position local2P_P(w,6,x) of the pixel between the corrected reference node nd'(w,6) and the reference node nd(w,7), according to the offset local2P_offset_S'(w,5). The respective calculation method is as follows:

$$local2P\_offset\_S'(w, 6) = -local2P\_offset\_S'(w, 5),$$

$$local2P\_D'\_S'(w, 6) = local2P\_D\_S'(w, 6) + local2P\_offset\_S'(w, 6), \text{ and}$$

$$local2P\_P(w, 6, x) = nd'(w, 6) + \frac{local2P\_D\_S'(w, 6)}{local2P\_D'\_S'(w, 6)} \times x.$$

Thus, the C-shape two-point local correction can be performed on the zone A.

Three-Point Local Correction Method

This method is to map the correction function to three successive reference nodes on one vertical local adjustment line so as to correct the zone pertaining thereto. For example, the three-point local correction is performed on the zone B enclosed by the horizontal local adjustment lines H3 and H5 and the vertical local adjustment lines V3 and V5.

The difference between the three-point local correction method of this embodiment and the two-point local correction method will be described in the following. The three-point local correction method is to correspond the front half and the rear half of the coordinate values of the horizontal axis of the selected correction function to the reference segments S'(20,3) to S'(120,3) and the reference segments S'(120,3) to S'(160,3) in the zone B, respectively. For example, when the selected correction function is the curve c, the horizontal coordinates 1 to 125 and 125 to 250 thereof respectively map to the reference segments S'(20,3) to S'(120,3) and the reference segments S'(120,3) to S'(160,3) in order to obtain the corresponding local correction parameters local3P_C(20) to local3P_C(160), respectively. Because all the methods of performing the local corrections according to the local correction parameters are the same, illustrations will be made according to the correction parameter local3P_C(w') by taking the reference segments S'(w',3) and S'(w',4) on the $w'^{th}$ horizontal image scan line as an example, wherein $20 \leq w' \leq 160$.

The image correction method of this embodiment may also obtain the data, such as the offset local3P_offset_S'(w',3), the adjusted segment length local3P_D'_S'(w',3), the position of the corrected reference node nd'(w,4) and the positions local3P_P(w',3,x) of the pixels between the corrected reference node nd'(w',4) and the reference node nd(w',3) according to the equations similar to those of the two-point local correction method. The respective calculation method is as follows:

$$local3P\_offset\_S'(w', 3) = local3P\_C(w') \times gn\_local3P\_C,$$

$$local3P\_D'\_S'(w', 3) = local3P\_D\_S'(w', 3) + local3P\_offset\_S'(w', 3),$$

$$nd'(w', 4) = nd(w', 3) + local3P\_D'\_S'(w', 3), \text{ and}$$

$$local3P\_P(w', 3, x) = nd(w', 3) + \frac{local3P\_D\_S'(w', 3)}{local3P\_D'\_S'(w', 3)} \times x.$$

Thus, the image data between the corrected reference node nd'(w',4) and the reference node nd(w',3) may be generated by way of scaling and interpolation, wherein gn_local3P_C is the corresponding gain value.

The sum of the offsets, such as local3P_offset_S'(w',3) and local3P_offset_S'(w',4), of the two reference segments on the same horizontal image scan line in the zone B should be equal to zero. That is, $$local3P\_offset\_S'(w,4) + local3P\_offset\_S'(w,3) = 0.$$

This represents that the image display result in the zone other than the zone B will not be influenced when the local correction in the zone B is performed. Thus, it is also possible to obtain the data, such as the offset local3P_offset_S'(w',4), the adjusted segment length local3P_D'_S'(w',4) and the position local3P_P(w',4,x) of the pixel between the corrected reference node nd'(w',4) and the reference node nd(w,5) according to the offset local3P_offset_S'(w',3). The respective calculation method is as follows:

$$local3P\_offset\_S'(w', 3) = -local3P\_offset\_S'(w', 4),$$

$$local3P\_D'\_S'(w', 4) =$$
$$local3P\_D\_S'(w', 4) + local3P\_offset\_S'(w', 4), \text{ and}$$

$$local3P\_P(w', 3, x) = nd'(w', 4) + \frac{local3P\_D\_S'(w', 4)}{local3P\_D'\_S'(w', 4)} \times x.$$

Thus, the C-shape three-point local correction can be performed on the zone B.

In this embodiment, the C-shape two-point and three-point local corrections are respectively performed on the zones A and B. However, the image correction method of this embodiment is not restricted thereto. Instead, any other type of local correction may be performed.

The image correction method of this embodiment may also perform the C-shape two-point zone correction on the zone enclosed by the horizontal local adjustment lines H6 and H7 and the vertical zone adjustment lines V5 and V7, wherein the corresponding gain value thereof is smaller than zero, for example. Consequently, the S-shape three-point local correction is substantially performed on the zone enclosed by the horizontal zone adjustment lines H5 and H7 and the vertical zone adjustment lines V5 and V7.

Alternatively, in the image correction method of this embodiment, another curve, such as the curve k, c, s, w, t or b, may be selected to map to each reference segment in the to-be-corrected zone so that the K-shape, C-shape, S-shape, W-shape, T-shape or B-shape two-point or three-point local correction can be performed on the zone of the original image F1.

The image correction method of this embodiment may also respond to two or more curves to correspondingly find out the two or more correction parameters corresponding to the zone of the original image F1. For example, when the two-point local correction is performed on the zone A, the correction parameters local2P_K(w), local2P_C(w), local2P_S(w), local2P_W(w), local2P_T(w) and local2P_B(w) are respectively found according to the curves k, c, s, w, t and b. Thereafter, the two-point local correction offset local_offset_2P(w) corresponding to the reference segments of the $w^{th}$ horizontal image scan line is calculated to perform the K, C, S, W, T and B-shape two-point local corrections on the zone A according to the equation:

$$\begin{aligned}
\text{local\_offset\_2P}(w) = \\
\text{gn\_local2P\_K} \times \text{local2P\_K}(w) + \text{gn\_local2P\_C} \times \text{gn\_local2P\_C}(w) + \\
\text{gn\_local2P\_S} \times \text{local2P\_S}(w) + \text{gn\_local\_W} \times \text{local\_W}(w) + \\
\text{gn\_local2P\_T} \times \text{local2P\_T}(w) + \text{gn\_local\_B} \times \text{local\_B}(w),
\end{aligned}$$

wherein gn_local2P_K, gn_local2P_C, gn_local2P_S, gn_local2P_W, gn_local2P_T and gn_local2P_B are respective gain values corresponding to the above-mentioned correction parameters.

The image correction method of this embodiment may also perform the K, C, S, W, T and B-shape three-point local corrections on the zone of the original image F1 according to the method similar to that for the two-point local correction method and the equations. For example, when the three-point local correction is performed on the zone B, the correction parameters local3P_K(w'), local3P_C(w'), local3P_S(w'), local3P_W(w'), local3P_T(w') and local3P_B(w') are respectively found according to the curves k, c, s, w, t and b. Then, the three-point local correction offsets locap3P_offset_(w') corresponding to the reference segments of the $w^{th}$ horizontal image scan line are calculated to perform the K, C, S, W, T and B-shape three-point local corrections on the zone B according to the equation:

$$\begin{aligned}
\text{local3P\_offset\_}(w') = \\
\text{gn\_local3P\_K} \times \text{local3P\_K}(w') + \text{gn\_local3P\_C} \times \text{local3P\_C}(w') + \\
\text{gn\_local3P\_S} \times \text{local3P\_S}(w') + \text{gn\_local3P\_W} \times \text{local3P\_W}(w') + \\
\text{gn\_local3P\_T} \times \text{local3P\_T}(w') + \text{gn\_local3P\_B} \times \text{local3P\_B}(w'),
\end{aligned}$$

wherein gn_local3P_K, gn_local3P_C, gn_local3P_S, gn_local3P_W, gn_local3P_T and gn_local3P_B are respective gain values corresponding to the above-mentioned correction parameters.

The image correction method of this embodiment may also perform the three-point local correction on the zone, on which the two-point local correction has been performed. For example, after the K, C, S, W, T and B-shape two-point local corrections have been performed on the zone A, the three-point zone correction is additionally performed on the zone enclosed by the horizontal local adjustment lines H4 and H6 and the vertical local adjustment lines V5 and V7. At this time, the local correction offset local_offset_(w) is found to perform the K, C, S, W, T, B-shape two-point and three-point local corrections on the zone A according to the two-point and three-point local correction offsets locap2P_offset_(w) and local3P_offset_(w) corresponding to the reference segments of the $w^{th}$ horizontal image scan line and according to the following equations:

$$\begin{aligned}
\text{local3P\_offset\_}(w'') = \\
\text{gn\_local3P\_K'} \times \text{local3P\_K}(w'') + \text{gn\_local3P\_C'} \times \text{local3P\_C}(w'') + \\
\text{gn\_local3P\_S'} \times \text{local3P\_S}(w'') + \text{gn\_local3P\_W'} \times \text{local3P\_W}(w'') + \\
\text{gn\_local3P\_T'} \times \text{local3P\_T}(w'') + \text{gn\_local3P\_B'} \times \text{local3P\_B}(w'') \\
120 \le w'' \le 260, \text{ and} \\
\text{local\_offset\_}(w) = \text{local2P\_offset\_}(w) + \text{local3P\_offset\_}(w) \\
160 \le w \le 260.
\end{aligned}$$

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image correction method for a cathode ray tube (CRT) television system, the method comprising the steps of:
    (a) responding to an operation event to obtain a plurality of gain values;
    (b) determining n offsets, which respectively correspond to n segments between any two adjacent nodes of (n+1) nodes, according to the gain values and a plurality of correction functions corresponding to the gain values, each of the n segments having an original segment length, wherein n is a natural number;
    (c) correcting the original segment lengths of the n segments to generate n adjusted segment lengths according to the n offsets;
    (d) determining corrected positions of the (n+1) nodes according to the n adjusted segment lengths and a data enable signal; and
    (e) determining pixel positions and corresponding image data between the two adjacent nodes of the (n+1) nodes according to ratios of the n adjusted segment lengths to the corresponding n original segment lengths.

2. The method according to claim 1, wherein the step (d) comprises:
    (d1) accumulating the n adjusted segment lengths to obtain a horizontal scan line length;
    (d2) searching back by one half of the horizontal scan line length from a middle time point of an enable period of the data enable signal to obtain the corrected position of a starting node of the (n+1) nodes; and
    (d3) determining the corrected positions of the other n nodes according to the starting node and the adjusted segment lengths.

3. The method according to claim 1, wherein the step (e) performs an interpolation operation according to the ratios of the n adjusted segment lengths to the corresponding n original segment lengths, and a plurality of pieces of pixel data of the n original segment lengths to obtain the pixel data of the n adjusted segment lengths.

4. The method according to claim 1, wherein the correction functions comprise an outer frame correction function, an inner frame correction function and a local correction function.

5. The method according to claim 4, wherein the correction functions are sine wave functions.

6. The method according to claim 4, wherein the correction functions are polynomial functions.

7. The method according to claim 1, wherein the step (b) further comprises:
generating a correction parameter in correspondence with each of the segments, wherein each of the segments corresponds to the same correction parameter.

8. The method according to claim 1, wherein the step (b) further comprises:
generating a correction parameter in correspondence with each of the segments, wherein each of the segments corresponds to different correction parameters.

9. The method according to claim 8, wherein the step (d) further comprises:
multiplying the correction parameters by the gain values to generate the n offsets corresponding to the segment lengths; and
adding each of the original segment lengths to the corresponding n offsets to generate the n adjusted segment lengths,
wherein the sum of all of the n offsets is equal to zero.

10. The method according to claim 1, further comprising the step of:
setting a horizontal image zone, which comprises a plurality of horizontal image scan lines;
wherein the horizontal image zone and any two adjacent segments constitute a local correction zone corresponding to a correction function.

11. The method according to claim 1, further comprising the steps of:
setting a first horizontal image zone, which comprises a plurality of first horizontal image scan lines;
setting a second horizontal image zone, which comprises a plurality of second horizontal image scan lines,
wherein the first horizontal image zone abuts upon the second horizontal image zone, and the first horizontal image zone, the second horizontal image zone and any two adjacent segments constitute a local correction zone, which corresponds to a correction function.

12. The method according to claim 1, wherein the image is an image of a cathode ray tube (CRT) television system.

13. The method according to claim 1, wherein the image data are digital image data.

* * * * *